Patented Aug. 8, 1933

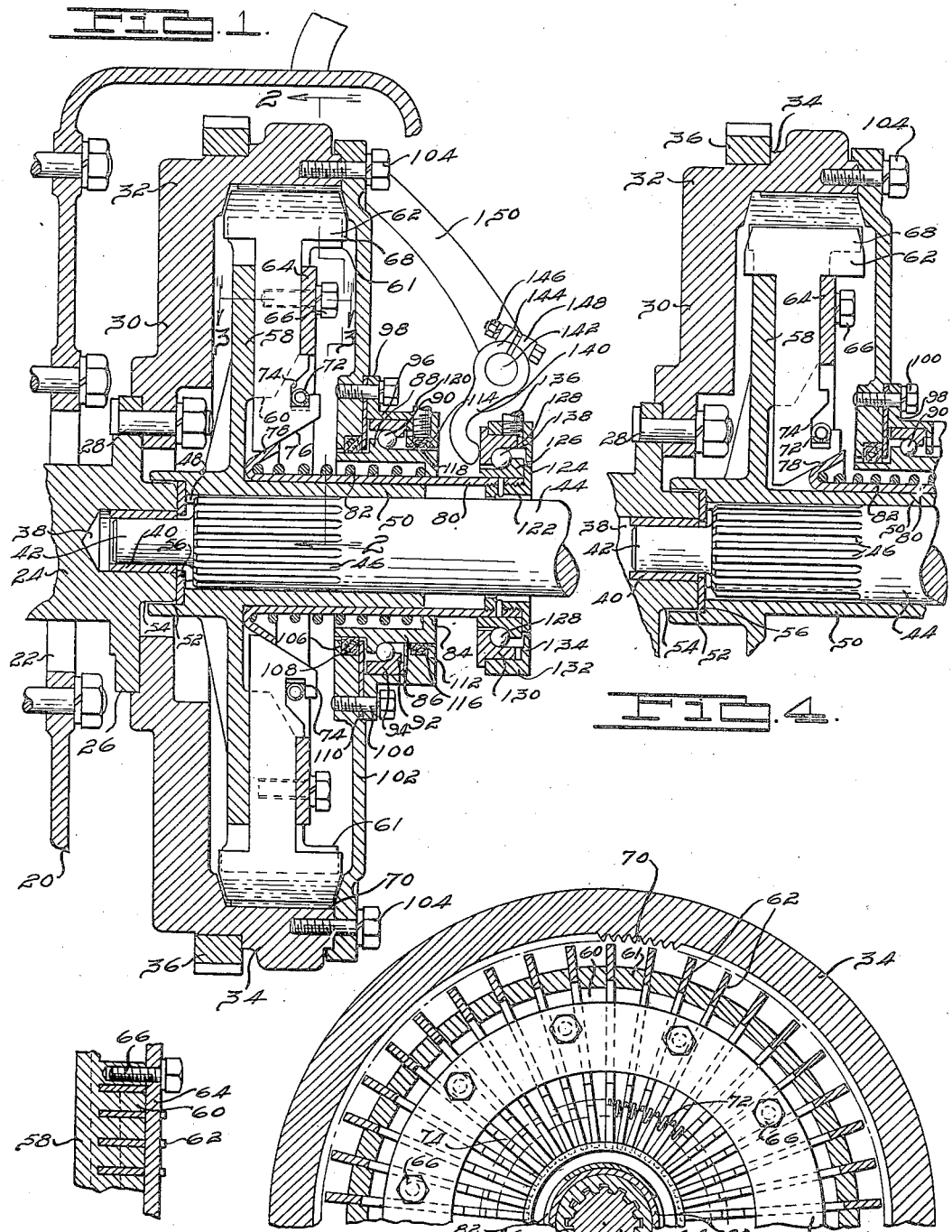

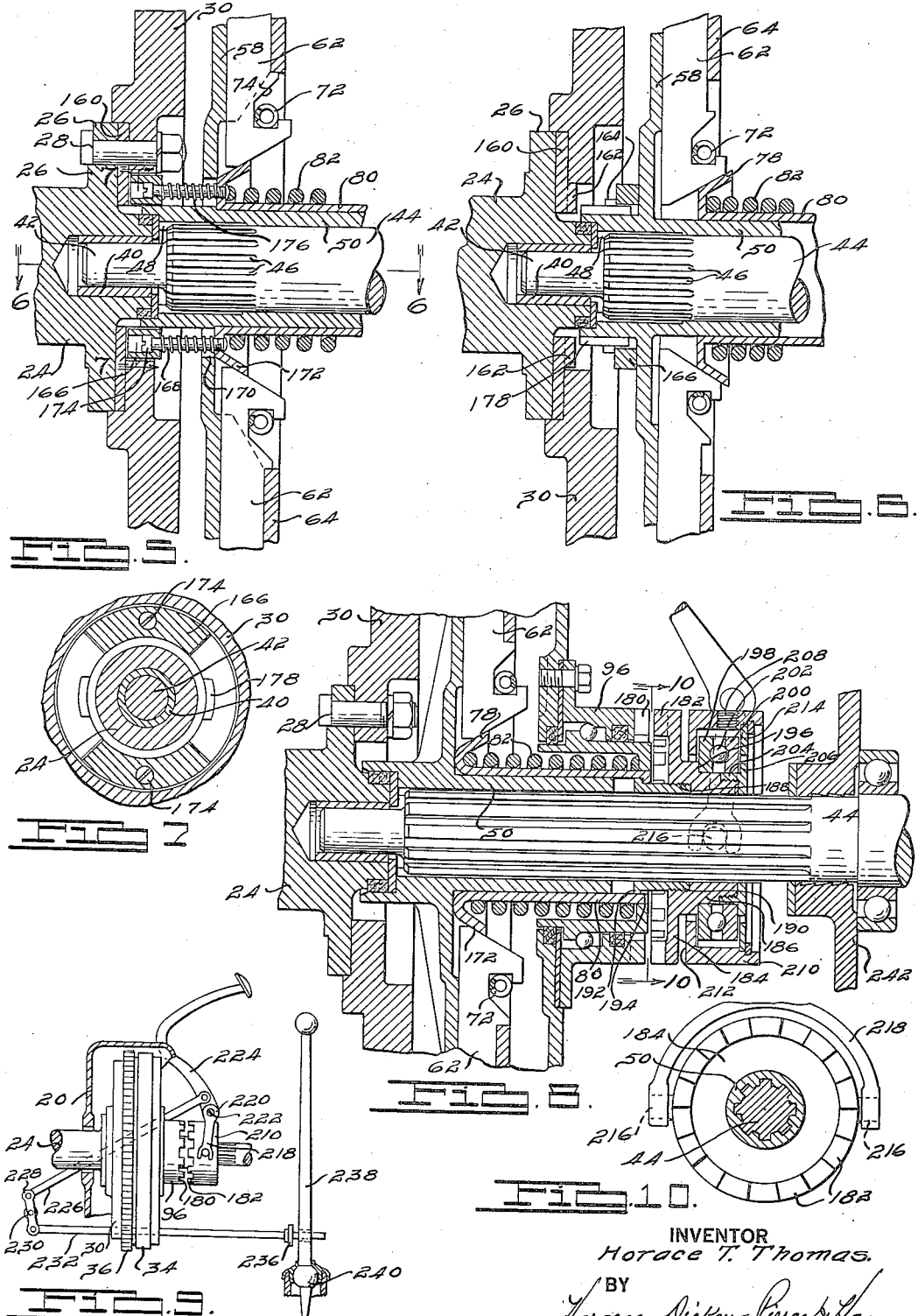

1,921,048

UNITED STATES PATENT OFFICE 1,921,048

CLUTCH

Horace T. Thomas, Lansing, Mich., assignor to Reo Motor Car Company, Lansing, Mich., a Corporation of Michigan Application June 29, 1931. Serial No. 547,545

10 Claims. (Cl. 192—57)

This invention relates to a power transmitting clutch and it has particular relation to that type of clutch in which relatively movable power transmitting elements of a clutch are interconnected through the agency of a fluid medium.

The invention has for its main object the provision of a hydraulic type of clutch in which relative slippage between the driving element and the driven element may readily be controlled by the operator, provision of a clutch of the hydraulic type in which power losses because of the turbulence in the fluid power transmitting medium is reduced to a minimum, the provision of a clutch in which the driving element and the driven element may be positively and mechanically interconnected after movement of the driven element has been initiated through the agency of the fluid medium, the provision of a clutch of the hydraulic type in which means are provided for obtaining a mechanical driving connection between the driving element and the driven element when the relative rate of rotation of the latter two elements approach synchronism, the provision of a hydraulic clutch including a positive mechanical clutch mechanism which is automatically actuated as the driven element approaches synchronism with the driving element, the provision of a clutch employing mercury as a power transmission medium, the provision of a clutch of the above indicated character which is simple in construction and economical to manufacture and which is durable and efficient in operation.

In the construction of automobiles as well as many other machines in which power is transmitted from a driving shaft to a driven shaft it is desirable to provide some form of releasable clutch between the driving element and the driven element which may at the will of the operator be so manipulated as to either interconnect or disconnect the driving and the driven elements. For this purpose some form of mechanical clutch has heretofore been employed. In some instances these clutches have comprised friction discs the lateral faces of which could be selectively engaged or disengaged to obtain power transmission from one disc to the other. In other constructions relatively movable clutch elements having intermeshing teeth were provided. These constructions were not satisfactory in actual operation for various reasons. For example, in the case of the friction disc type of clutch relative rotation between the driving and the driven surfaces occurred at the time of starting. Also in certain circumstances there was a considerable degree of slippage between the surfaces. As a result there was a loss of power and accompanying wear of such surfaces. In the type of clutch employing intermeshing teeth engagement and disengagement of the driving element and driven element was extremely sudden and as a result violent shocks were transmitted to the mechanism. Furthermore, since such clutches could only be engaged when the driving element or the driven element were standing still, or were rotating at very slow speeds the clutches were quite unsuitable for use in mechanisms where it was desirable to engage or disengage the clutch while the driving element and the driven element were in motion.

In order to overcome these defects of the mechanical type of clutch, it has heretofore been proposed to employ what was termed a hydraulic clutch in which the driving element and the driven element were interconnected solely through the agency of a fluid medium such as mercury or oil. However, this type of clutch has not proven satisfactory as heretofore constructed because of excessive turbulence generated in the fluid transmission medium which resulted in high power losses and a resultant generation of heat in the medium, and because the rate of slippage between the driving and the driven elements could not be controlled. This invention comprises the provision of a hydraulic type of clutch in which means is provided for overcoming the above noted defects.

For a better understanding of the invention reference may now be had to the accompanying drawings in which Fig. 1 is a cross sectional view of a clutch mechanism embodying certain features of the invention.

Fig. 2 is a fragmentary cross sectional view taken substantially as upon the line 2—2 of Fig. 1.

Fig. 3 is a fragmentary cross sectional view taken substantially upon the line 3—3 of Fig. 1.

Fig. 4 is a fragmentary cross sectional view disclosing certain elements of mechanism disclosed in Fig. 1.

Fig. 5 is a fragmentary cross sectional view of a hydraulic clutch mechanism constructed in accordance with the provisions of the present invention and including a positively acting dental clutch which automatically engages when the clutch element approaches synchronism.

Fig. 6 is a fragmentary cross sectional view taken substantially upon the line 6—6 of Fig. 5.

Fig. 7 is a fragmentary cross sectional view disclosing the intermeshing elements of the dental clutch on a larger scale.

Fig. 8 is a fragmentary cross sectional view of a hydraulic clutch mechanism as previously disclosed in combination with a slightly modified form of dental clutch mechanism for positively interconnecting the driving element and the driven element when they are rotating approximately at synchronous speeds.

Fig. 9 is an elevational assembly view of a power transmission mechanism as employed in an automobile which embodies the construction disclosed in Fig. 8.

Fig. 10 is a fragmentary cross sectional view taken substantially upon the line 10—10 of Fig. 8 and disclosing certain elements of the dental clutch.

In practicing the invention, a clutch housing 20 shown in Fig. 1, which may be secured in conventional manner to the crank case of an engine (not shown) is formed with an opening 22 through which an engine crank shaft 24 projects. A flange 26 formed adjacent to the rear extremity of the crank shaft is bored to receive bolts 28 which extend through a web portion 30 of a hydraulic clutch casing 32. An axially rearwardly extending flange 34 is formed about the outer periphery of the web 30 and is provided with a starting gear 36 which is relatively non-rotatably mounted thereupon. The rear extremity of the shaft 24 is bored as indicated at 38 to receive a bearing bushing 40 which rotatably receives a reduced end portion 42 of a driven shaft 44.

Axially extending grooves 46 upon the forward extremity of the shaft 44 intermesh with corresponding tongues 48 formed in the inner periphery of a sleeve 50. This sleeve encloses the forward end of the shaft 44 and is formed with an enlarged recess 52 within which the rear extremity of the shaft 24 is adapted to rotate. A washer 56 upon the reduced portion 42 of the shaft 44 constitutes a thrust bearing between the end of the crank shaft 24 and the bottom of the recess 52 within the sleeve 50.

A radially outwardly extending flange 58 providing a clutch rotor is formed about a sleeve 50, and the forward face of this flange is formed with a series of radially extending ribs 60 of wedge shape which have heads 61 and constitute guides for radially extending and radially slidable impeller blades 62. The blades may conveniently be locked from displacement from between the ribs by means of an annular disc 64 which is secured to the rib 60 by means of stub bolts 66. Paddle like heads 68 are formed on the outer extremities of the blades 62 and are adapted to project into proximity to serrations 70 formed within the flange 34 in order to increase the resistance to passage of fluid medium between the extremities of the impeller blades and the enclosing casing.

The blades 62 are resiliently retracted from the inner periphery of the flange portion 34 by means of a garter spring 72 of conventional design which is disposed in hook like notches or slots 74 formed adjacent to the inner extremity of the impeller blade. The inner extremity of the blades are beveled as indicated at 76 to provide cam surfaces which engage corresponding or mating surfaces provided by an outwardly and rearwardly directed cam flange 78 formed upon the forward extremity of a sleeve 80, forward movement of which, as shown in Fig. 1, is limited by engagement with the disc 58. This sleeve is resiliently actuated forwardly by means of a coil spring 82 which is disposed thereabout and which engages at its forward extremity the flange 78 and at its rear extremity an annular flange 84 formed at the rear extremity of the inner periphery of a bearing sleeve 86.

A bearing flange 88 is formed about the outer periphery of the sleeve and is engaged by series of ball bearings 90 which in turn engage an inwardly directed flange 92 formed within an outer bearing race 94. This race is disposed within a sleeve 96 having a flange 98 secured by means of bolts 100 to a disc 102 constituting a closure for the rear of the recess within the flange 34. This disc is secured at its outer periphery to the rear face of the flange 34 by means of stud bolts 104 and at its inner periphery is formed with a groove or slot 106 which receives packing 108 adapted to seal between the inner periphery of the disc and the outer periphery of the sleeve 86 whereby to prevent the escape of fluid between the latter elements. The packing is maintained from rearward displacement within the slot by means of a washer 110 which is clamped between the rearward face of the disc 102 and the forward face of the flange 98.

As best shown in Fig. 1, the sleeve 96 is formed at its inner extremity with an inwardly directed flange 112 which is adapted to prevent rearward displacement of the ball race 94. The flange is also grooved at 114 to receive a second packing ring 116 about the sleeve 86. The ring is maintained from forward displacement by means of a washer disc 118, the forward face of which engages the rearward face of the ball race 94. Lubricants may be supplied to the packing by means of a conventional conduit 120 extending through sleeve 96.

For purposes of retracting the sleeve 80 a sleeve 122 is threaded into the rear extremity thereof and is provided with a radially extending flange 124 which engages the rear face of an inner ball race 126. Balls 128 are confined between this race and an outer race 130 which is surrounded by a collar 132 having an inwardly directed flange 134 formed about its inner periphery. If desired, a conduit 136 for lubricants may be provided in the collar 132 and lubricant therefrom may be transmitted to the balls 128 through a channel 138 formed in the outer ball race 130.

The ball bearing construction thus provided upon the rear extremity of the sleeve 80 may be actuated rearwardly to retract the sleeve and thus to permit radially inward movement of the impeller blades 62 by means of a lever 140 having an end bearing on the forward face of collar 130. The lever is fixedly clamped upon a shaft 142 which may be journaled in bearings in any convenient portion of the chassis of an automobile (not shown). This clamping action is effected by means of a split collar 144 integrally formed with the lever 140 and adapted to be contracted by means of a bolt 140 extending through lugs 148 upon the collar. The shaft 142 is actuated by means of a lever (preferably a foot lever) 150 of conventional design.

In the operation of this embodiment of the invention it will be assumed that the crank shaft 24 is rotating and that the impeller blades 62 are retracted to their radially innermost position which position they assume upon rearward retraction of the sleeve 80 to permit the cam surfaces 76 to move downwardly along the cam flange 78. This is the condition of the various elements when the engine is normally idling and the motor car in which the clutch is employed is standing still. Because of the relatively low speed of the crank shaft under these conditions and further because of the relatively great space between the serrations 70 in the flange 34 and the outer extremities of the impeller blades 62 comparatively little rotational effort is transmitted from the driving portion of the clutch to the driven portion including the flange 58 and the shaft 44. If it is desired to transmit power on the crank shaft 24 to the shaft 44 the shaft 24 is speeded up by acceleration of the engine (not shown) and the clutch lever 150 is gradually released to permit the forward actuation of the sleeve 80. This movement causes the impeller blades 62 to be actuated radially outwardly by the cam flange 78 and thus eventually bring the outer extremities of the blades into relatively close proximity to the serrations 70. As a result, the flow of oil or other fluid which may be employed for filling the clutch casing is greatly impeded and propelling power is transmitted from the shaft 24 through the impeller blades 62, the disc or flange 58 and the sleeve 50 to the driven shaft 44. By properly regulating the advance of the sleeve 80 by means of a lever 150 the intensity of the propulsive efforts on the crank shaft 24 to the driven shaft 44 may be gradually and progressively increased without any shock to the attendant mechanism.

Under certain circumstances it may be desirable to lock the crank shaft 24 into positive driving relation with respect to the driven shaft 44. This may be accomplished by means of an automatic dental clutch mechanism best shown in Figs. 5, 6 and 7. Since the structure of the casing and the internal rotor within this casing in this form of the invention are identical with those previously described in connection with the form of the invention disclosed in Figs. 1 to 4 inclusive, the reference numerals previously employed in connection with the form of the invention already described will be reused to designate the various elements which are common to both structures. The description of the embodiment of the invention as disclosed in Figs. 1 to 4 inclusive also apply to the figures now under consideration. Only the dental clutch employed for interlocking the crank shaft and the driven shaft for positive driving will now be discussed in detail.

This clutch comprises an annular disc 160 which is clamped between the flange 26 and the web 30 by means of the bolts 28. As shown in Fig. 6 the rearward face of this disc adjacent to the inner periphery thereof is formed with a pair of rearwardly extending clutch teeth 162 that are adapted to mate with corresponding teeth 164 formed on the forward face of a ring 166 that slides upon retraction bolts 168. Bolts 168 extend rearwardly through openings 170 formed in the disc 58 and at their rearward extremity are threaded into openings formed in a rearwardly and outwardly directed flange 172 corresponding to the flange 78 as described in Figs. 1 and 4. As best shown in Fig. 5 the clutch ring or disc 166 is actuated forwardly when the sleeve 80 is in forward position into engagement with heads 174 upon the bolts 168 by means of coil springs 176 engaging at their rear extremities with the forward face of the flange 172 and at their forward extremities with the rearward face of the ring 166. The latter element is maintained from rotation with respect to the sleeve 50 by means of spline like ribs 178 formed upon the sleeve and intermeshing with corresponding slots formed in the inner periphery of the ring. It is to be understood that the clutch elements 164 and 162 are relatively accurately machined so that they closely interfit with each other when they are in engagement. In fact the fit is so close that when they are disengaged and the crank shaft 24 and the driven shaft 44 are rotating at any appreciable speed with respect to each other the sleeves merely slide over each other upon coming into contact without dropping into driving engagement. This relative sliding without engagement as the sleeve 80 is advanced is permitted by reason of the slidable engagement of ring 166. However, as the impeller blades 62 approach the serrations 70 and the speed of the drive shaft 44 approaches closely that of the crank shaft 24, the elements 164 traverse the faces of the elements 162 at a very slow rate of speed. As a result the period of time in which the sleeves 162 and 164 are in proper alignment with respect to each other becomes sufficient to permit the teeth 164 to drop into the space between the teeth 162 under the urge of the spring 176. When this occurs, the crank shaft 24 and the driven shaft 44 are positively interlocked and the hydraulic clutch becomes ineffective. The clutch teeth 164 are retracted from engagement with the teeth 162 by retraction of the sleeve 80. As a result of the retraction of the sleeve the bolts 176 are also retracted thereby moving the clutch ring or disc 166 rearwardly.

In the form of the invention disclosed in Figs. 8, 9 and 10 a modified form of clutch for obtaining positive driving connection between the drive shaft and the driven shaft is employed. This clutch is placed exteriorly of the hydraulic clutch casing upon the shaft 44 and is operated by manually controlled means including a convenient linkage connected to a lever such as a conventional gear shift lever. The clutch includes clutch teeth 180 formed on the rear face of the sleeve 96 and adapted to mate with corresponding teeth 182 upon the forward face of a flange 184, integral with a sleeve 186 provided upon the shaft 44. This sleeve is formed with an interiorly threaded recess 188 into which the rearward end of a sleeve 190 is threaded. The forward extremity of the latter is provided with a radial flange 192 which engages a corresponding flange 194 projecting inwardly at the rearward extremity of the impeller blade actuating sleeve 80.

It is thus apparent that the spring 82 about the sleeve 80 constitutes means for simultaneously advancing or retracting both the sleeve 80 and the clutch disc 184. The sleeve 186 preferably is formed with a shoulder 196 adapted to engage the forward face of an annular ring or disc 198 constituting a forward race of a ball bearing having a corresponding rearward race 200 and balls 202 disposed between the races. Rearward displacement of the ball bearing is prevented by means of a sleeve 204 threaded upon the rearward extremity of the sleeve 186 and having a radial flange 206 engaging the rearward face of the race 200. Lubricant for the bearing is supplied through a conduit 208 and in order to more effectively retain lubricant within the bearing a sleeve 210 is disposed thereabout and is provided at its forward end with an inwardly projecting flange 212 which mates or engages the forward face of the ball race 198.

Adjacent to its rearward extremity the sleeve 210 is formed with peripherally extending grooves which receive annular discs 214 that lock the ball bearing from rearward displacement within the sleeve and also protects the bearing from dust and foreign matter. For purposes of actuating the sleeve 186 into clutch engaging or disengaging position, the sleeve 210 is provided with laterally projecting shifter lugs 216 upon which a shifter yoke 218 is pivotally mounted. This yoke as shown in Fig. 9 is provided with an upwardly extending lug 220 upon a shifter shaft 222.

The shafts may be rotated in suitable bearings formed in any convenient portion of the vehicle chassis by means of a pedal 224 corresponding to the conventional clutch pedal. Depression of this clutch pedal causes counter clockwise rotation of the shaft 222 and a resultant retraction of the sleeve 210. Any suitable mechanism may be provided for purposes of effecting engagement of the clutch teeth 180 and 182, the particular mechanism shown more or less diagrammatically by way of illustration of one form including a link 226 pivoted to the lever 224 and further pivoted at its forward extremity to the upper extremity of a lever 228 which is pivoted intermediate of its ends to a convenient portion of the motor chassis (not shown) by means of a shaft 230. The lower extremity of the lever 228 is pivoted to a rearwardly extending rod 232 which is slidable in suitable bearings (not shown) and is provided adjacent to its rearward extremity with a collar 236. This collar is engaged by a shifting lever 238, which may constitute the conventional transmission control lever, and when moved forwardly beyond a normal position, actuates the rod 232 forwardly and thus through the agency of the lever 238 and the link 226 urges the lever 224 rearwardly to bring the clutch teeth 180 and 182 into engagement. It is to be understood that these teeth, like teeth 162 and 164 in Fig. 6 are machined for a comparatively close fit. If the disc 184 and the sleeve 196 are rotating with respect to each other at any great angular velocity the adjacent end faces of the clutch teeth may merely glide over each other and the interval of time in which the teeth are in mating alignment with respect to each other may be so short that the axially movable teeth do not have time to drop into intermeshing relation with the teeth 180. However, as the driven shaft 14 is speeded up approximately to synchronism with the crank shaft 24, the interval of time in which the clutch teeth are in proper alignment becomes sufficiently great to permit clutch teeth 182 to intermesh with clutch teeth 180.

The shifting lever 238 may be journaled in a ball and socket joint 240 of conventional design. Rearwardly of the sleeve 210 the shaft 44 may be journaled in a bearing indicated generally at 242. Since this bearing is of conventional construction and does not constitute a feature of the applicant's invention detailed description thereof is not given.

Operation of this embodiment of the applicant's invention is as follows. It will be assumed that the shaft 44 is at rest and that the crank shaft 24 is rotating at idling speed. The cam sleeve 80 will be retracted and correspondingly the disc 184 will be retracted to disengage clutch teeth 180 and 182. When it is desired to initiate the rotation of the shaft 44 the shifting lever 238 is moved forwardly to actuate the lever 224 and thus to actuate the shifting yoke 218, thereby moving the sleeve 210 forwardly and correspondingly moving the sleeve 188. Movement of the latter causes the cam 78 to actuate the impeller blades 62 outwardly into proximity to the serrations 70 as discussed in connection with the embodiment of the invention disclosed in Figs. 1 to 4. The impeller blades are actuated outwardly by advancing lever 238 until the forward end of the sleeve 80 engages with the rear face of the flange 58, the latter thus acts as a limit stop for the sleeve. Sleeves 80 and 188 are so proportioned that the sleeve 80 may be fully advanced without the clutch teeth 180 coming into contact with the teeth 182. By this construction the maximum driving effort of the hydraulic clutch is obtained without actual contact of the teeth of the dental clutch. However, it will be observed that the sleeve 188 is adapted to slide forwardly into the sleeve 80 and as the clutch disc 184 is advanced relative axial movement of the two sleeves occurs until the clutch teeth come into contact. However, because of the accuracy of the fit between the teeth they can not come into mesh until the shaft 44 has speeded up approximately into synchronism with the crank shaft 24. When this occurs the clutch teeth may readily be intermeshed to obtain positive driving merely by a slight forward actuation of the lever 238.

In the various embodiments of the invention any conventional fluid such as oil may be used as a transmission medium. Mercury may also be used, and because of its weight and low volatility, is very satisfactory. However it must be carefully sealed. The quantity of fluid used should be sufficient to fill the space between the casing and the tips of the impeller blades when the latter are as retracted and the casing is rotating at sufficient speed centrifugally to uniformly distribute the fluid.

It will be apparent that I have provided a hydraulic clutch mechanism in which the proportion of power transmitted from the driving shaft to the driven shaft may be gradually and continuously varied from substantially zero up to a maximum. It will also be apparent that the proportion of power transmitted from one shaft to the other is extremely high. It will also be apparent that I have provided a clutch mechanism in which hydraulic action is employed for initially speeding up the driven shaft after which the driving and the driven shaft are mechanically locked together, thus obviating any loss of power in the clutch mechanism. Since the construction is simple to manufacture and easy to maintain, it is apparent that it is highly desirable from a commercial viewpoint.

Although I have described only the preferred embodiments of the invention, it is to be understood that numerous modifications may be made in the construction as disclosed without departing from the spirit of the invention or from the scope of the appended claims.

I claim:

1. A hydraulic clutch mechanism comprising a driving shaft, a driven shaft, a housing on one of the shafts, a rotor secured to the other of the shafts and disposed within the housing, impeller blades mounted upon the rotor for radial sliding movement and axially movable cam means engaging the inner extremities of the impeller blades for actuating the latter outwardly to bring the outer extremity thereof into proximity to the inner periphery of the casing and means resiliently urging the blades into contact with the cam means.

2. A hydraulic clutch mechanism comprising a driving shaft, a driven shaft, a housing on one of the shafts, a rotor secured to the other of the shafts and disposed within the housing, impeller blades mounted upon the rotor for radial sliding movement and axially movable cam means engaging the inner extremities of the impeller blades for actuating the latter outwardly to bring the outer extremity thereof into proximity to the inner periphery of the casing and means resiliently urging the blades into contact with the cam means, said means including a garter spring engaging all of the blades.

3. A clutch mechanism comprising a driving shaft, a driven shaft, a housing upon one of the shafts, a rotor secured upon the other shaft and disposed within the housing, said housing and said rotor adapted to be impositively interconnected by a fluid medium, a clutch element secured to each of the two shafts, the elements being provided with interengaging teeth and means for sliding one of the elements axially whereby to bring the teeth into engagement, said teeth being so formed that they will engage only when the shafts are rotating approximately in synchronism with each other.

4. A clutch mechanism comprising a driving shaft, a driven shaft, a housing upon one of the shafts, a rotor secured upon the other shaft and disposed within the housing, said housing and said rotor adapted to be impositively interconnected by a fluid medium, a clutch element secured to each of the two shafts, the elements being provided with interengaging teeth and means for sliding one of the elements axially whereby to bring the teeth into engagement, said teeth being so formed that they will engage only when the shafts are rotating approximately in synchronism with each other, such elements being actuated automatically into engagement by means of a spring.

5. A clutch mechanism comprising a pair of axially aligned shafts, a rotor housing rigidly secured upon one shaft and a rotor within the housing and rigidly secured upon the other shaft, impeller blades projecting radially from the rotor, a sleeve upon the rotor supporting shaft having means for actuating the blades radially, means for actuating the sleeve axially of the shaft, a dental clutch element upon one of the shafts and interconnected for sliding movement with the sleeve, and a second clutch element fixed upon the other shaft and engageable with the teeth of the first clutch element by sliding movement of the sleeve.

6. A clutch mechanism comprising a pair of axially aligned shafts, a rotor housing rigidly secured upon one shaft and a rotor within the housing and rigidly secured upon the other shaft, impeller blades projecting radially from the rotor, a sleeve upon the rotor supporting shaft having means for actuating the blades radially, means for actuating the sleeve axially of the shaft, a dental clutch element upon one of the shafts and interconnected for sliding movement with the sleeve, and a second clutch element fixed upon the other shaft and engageable with the teeth of the first clutch element by sliding movement of the sleeve, the first mentioned clutch element being relatively slidable with the element for actuating it toward the second clutch element.

7. A clutch mechanism comprising a pair of axially aligned shafts, a rotor housing rigidly secured upon one shaft and a rotor within the housing and rigidly secured upon the other shaft, impeller blades projecting radially from the rotor, a sleeve upon the rotor supporting shaft having means for actuating the blades radially, means for actuating the sleeve axially of the shaft, a dental clutch element upon one of the shafts and interconnected for sliding movement with the sleeve, and a second clutch element fixed upon the other shaft and engageable with the teeth of the first clutch element by sliding movement of the sleeve, the first mentioned clutch element being relatively slidable with the element for actuating it toward the second clutch element, the latter means including a spring engaging the sleeve and the clutch element.

8. A clutch mechanism comprising a pair of axially aligned shafts, a rotor housing rigidly secured upon one shaft and a rotor within the housing and rigidly secured upon the other shaft, impeller blades projecting radially from the rotor, a sleeve upon the rotor supporting shaft having means for actuating the blades radially, means for actuating the sleeve axially of the shaft, a dental clutch element upon one of the shafts and interconnected for sliding movement with the sleeve, and a second clutch element fixed upon the other shaft and engageable with the teeth of the first clutch element by sliding movement of the sleeve, the first mentioned clutch element being relatively slidable with the element for actuating it toward the second clutch element, the latter means including a manually controlled lever and a linkage interconnecting the lever and the clutch element.

9. A hydraulic clutch mechanism comprising a casing, a rotor disposed therein, a multiplicity of radially projecting impeller blades slidably secured to the rotor, each blade being disposed at a slight angle with respect to the next adjacent blade, resilient means constantly urging said blades toward projected positions, resilient means constantly urging said blades toward retracted position and means for controlling said first named resilient means.

10. A hydraulic clutch mechanism comprising a casing, a rotor disposed therein, a multiplicity of radially projecting impeller blades slidably secured to the rotor, each blade being disposed at a slight angle with respect to the next adjacent blade, a sleeve mounted on said rotor and axially movable thereon, cam means on said sleeve engaging the inner extremities of the impeller blades to bring the outer extremities thereof into proximity to the inner periphery of the casing, resilient means constantly urging said cam means against the inner extremities of the blades to move said blades toward projected positions, other resilient means constantly urging the blades into contact with said cam means and means for controlling the axial movement of said sleeve.

HORACE T. THOMAS.